United States Patent
Wang

(10) Patent No.: US 12,228,665 B2
(45) Date of Patent: Feb. 18, 2025

(54) UWB RANGING METHOD, UWB RANGING DEVICE AND STORAGE MEDIUM

(71) Applicant: BEIJING XIAOMI MOBILE SOFTWARE CO., LTD., Beijing (CN)

(72) Inventor: Feng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 255 days.

(21) Appl. No.: 17/710,370

(22) Filed: Mar. 31, 2022

(65) Prior Publication Data
US 2023/0139666 A1 May 4, 2023

(30) Foreign Application Priority Data
Oct. 29, 2021 (CN) .......................... 202111277123.6

(51) Int. Cl.
*G01S 15/00* (2020.01)
*G01S 5/02* (2010.01)
*H04W 64/00* (2009.01)

(52) U.S. Cl.
CPC .......... *G01S 5/0246* (2020.05); *G01S 5/0294* (2013.01); *H04W 64/003* (2013.01)

(58) Field of Classification Search
CPC .............................. G01S 5/0246; G01S 5/0247
USPC ..................................................... 455/456.1
See application file for complete search history.

(56) References Cited

U.S. PATENT DOCUMENTS

| 9,810,767 B1* | 11/2017 | Hamilton | ................. G01S 5/14 |
| 2010/0225541 A1* | 9/2010 | Hertzog | .................... G01S 5/10 |
| | | | 342/387 |
| 2016/0248438 A1 | 8/2016 | Lachartre | |
| 2018/0067196 A1 | 3/2018 | Irish et al. | |

FOREIGN PATENT DOCUMENTS

| CN | 107561515 A | 1/2018 |
| CN | 110133589 A | 8/2019 |
| CN | 113138378 A | 7/2021 |

OTHER PUBLICATIONS

Extended European Search Report issued in Application No. 22169119.9, dated Nov. 16, 2022, (8p).
The State Intellectual Property Office of People's Republic of China, "First Office Action" issued in APplication No. 202111277123.6 dated Nov. 13, 2024, with English translation, (19p).
"Eleventh Five-Year Plan" Textbooks for Electronics and Communication Majors in Colleges and Universities, Chen Zi edited for Yao Zhendong. "Application and training of DSP system", Xidian university Publishing House, 2008, p. 63-p. 69, with English translation, (34p).

* cited by examiner

*Primary Examiner* — Qutbuddin Ghulamali
(74) *Attorney, Agent, or Firm* — Arch & Lake LLP; Hao Tan; Shen Wang

(57) ABSTRACT

An Ultra Wide Band (UWB) ranging method, a UWB ranging device, and a non-transitory storage medium thereof are provided. The UWB ranging method includes: filtering, in response to determining a first time of flight for UWB ranging, the first time of flight based on a low-pass filter to obtain a filtered first time of flight; and performing the UWB ranging based on the filtered first time of flight.

17 Claims, 9 Drawing Sheets

UWB RANGING METHOD, UWB RANGING DEVICE AND STORAGE MEDIUM

CROSS REFERENCE TO RELATED APPLICATION

This application is based upon and claims the priority to Chinese Patent Application No. 2021112771236, filed on Oct. 29, 2021, the contents of which are incorporated herein by reference in their entireties for all purposes.

TECHNICAL FIELD

The present disclosure relates to the technical field of Ultra Wide Band (UWB), and in particular, to a UWB ranging method, a UWB ranging device and a storage medium.

BACKGROUND

Ultra Wide Band (UWB) technology is applied to the scenario of pointing control of smart home, where the user holds the mobile phone to point to the smart home that supports UWB function in order to achieve the purpose of pointing control by the mobile phone using the advantages of high-precision ranging and angle measurement of UWB technology. Pointing control can be understood that the control of the smart home can be performed by the mobile phone pointing to the smart home. For example, when the mobile phone points to the smart home, the smart home can be controlled according to the control card popped up in the mobile phone. In the above application scenario, the mobile phone can control the smart home only when the mobile phone and the controlled smart home within the agreed distance range.

SUMMARY

According to a first aspect of the present disclosure, a UWB ranging method is provided, which includes: filtering, in response to determining a time of flight for UWB ranging, the time of flight based on a low-pass filter to obtain a filtered first time of flight; and performing the UWB ranging based on the filtered time of flight.

According to a second aspect of the present disclosure, a UWB ranging device is provided, which includes a processor, and a memory storing executable instructions for the processor. The processor is configured to perform the UWB ranging method described in the first aspect.

According to a third aspect of the present disclosure, there is provided a non-transitory storage medium storing instructions that, when executed by a processor of a mobile terminal, enable the mobile terminal to perform the UWB ranging method described in the first aspect.

It should be understood that the above general description and the later detailed description are only exemplary and explanatory and do not limit the present disclosure.

BRIEF DESCRIPTION OF THE DRAWINGS

The accompanying drawings, which are incorporated in and constitute a part of this description, illustrate embodiments consistent with the disclosure, and are used in conjunction with the description to explain the principles of the disclosure.

DETAILED DESCRIPTION

Embodiments will be described here in detail, examples of which are illustrated in the accompanying drawings. When the following description relates to the drawings, the same numerals in different drawings refer to the same or similar elements unless otherwise indicated. The implementations described in the embodiments below are not intended to represent all implementations consistent with this disclosure. Rather, they are only examples of devices and methods consistent with some aspects of the present disclosure as recited in the appended claims.

UWB technology is a wireless communication technology, which transmits signals in a pulse manner. Compared with wireless communication technologies that use continuous carrier modulation, such as WiFi, Bluetooth, Zigbee, etc., UWB technology has the characteristics of high bandwidth, high signal-to-noise ratio, and strong anti-interference ability. It is widely used in smart home, data transmission, digital encryption key, real-time positioning and other fields. In the scenarios where UWB technology is applied, the distance between two devices is measured mainly by taking advantage of the high precision of UWB technology in distance and angle measurement.

Figure 1:
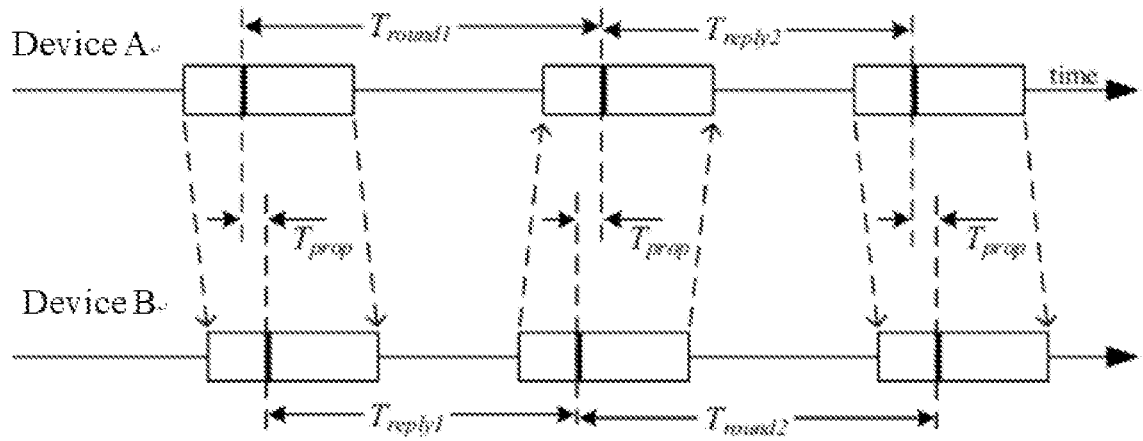
FIG. 1 is a schematic diagram of a Double Side, Two-way ranging method illustrated according to an embodiment.

There are various ranging schemes based on UWB technology, and Double Side, Two-way ranging (DS-TWR) is often used in point-to-point ranging applications. FIG. 1 is a schematic diagram of a DS-TWR method illustrated according to an embodiment. As shown in FIG. 1, four parameters $T_{round1}$, $T_{round2}$, $T_{reply1}$ and $T_{reply2}$ are obtained through three interactions between the two devices. The time $T_{prop}$, i.e., ToF, can be calculated from these four parameters by following equation.

$$\hat{T}_{prop} = \frac{T_{round1} \times T_{round2} - T_{reply1} \times T_{reply2}}{T_{round1} + T_{round2} + T_{reply1} + T_{reply2}},$$

where $T_{prop}$ represents the ToF of the signal between the two devices, $T_{round1}$ represents the time difference from when device A sends a ranging signal to when device A obtains an answering signal, $T_{reply1}$ represents the time difference from when device B obtains the ranging signal to when device B sends the answering signal, $T_{round2}$ represents the time difference from when device B sends the answering signal to when device B obtains an end signal, and $T_{reply2}$ represents the time difference from when device A obtains the answering signal to device A sends the end signal.

According to the ToF and the speed of light, the distance S between the two devices is obtained based on S=ToF×c, where c represents the speed of light.

In the related art, e.g., UWB and Kalman-based high-precision positioning for indoor parking lots, a UWB positioning base station is installed at a fixed position in the parking lot, and a positioning tag is installed on the vehicle. The distance between the positioning tag and the base station is calculated based on the ToF between the positioning base station and the positioning tag, and then the exact position of the vehicle is determined based on the distance between the positioning tag and the base station. In order to improve the accuracy of the vehicle position, a Kalman Filter is used to correct the vehicle position. In other words, error correction is performed in conjunction with the current vehicle speed in the use of the Kalman Filter.

In the pointing control scenario for smart homes, the device at the controlling end performs the pointing control on the smart homes using the UWB technology. In this scenario, the smart homes refer to Internet of Things (IoT) devices that support UWB technology, and the IoT devices may be TVs, air conditioners, washing machines, etc. In this pointing control scenario for the smart homes, the device at the controlling end can control the IoT device only when the device at the controlling end and the controlled IoT device within the agreed distance range to prevent interference from remote attackers.

In UWB-based ranging applications, the final ranging results are jittered due to factors such as system parameter jitter, random errors in the measurement process, and/or environmental interference. However, a large jitter range will affect the applications performed based on the ranging results. Thus, in order to improve the accuracy of the ranging results, the original value of ranging can be processed to reduce adverse effects. In the present disclosure, the original value of ranging is ToF.

The solutions in above-mentioned related art, when applied to the application scenarios of the present disclosure to improve the accuracy of the ranging results, may cause at least one of the following problems.

1. Additional Sensors are Added.

When the Kalman Filter is used to correct the position in the related art, the speed of the vehicle needs to be obtained. That is, in the related art, in addition to obtaining the ToF value generated by UWB ranging, it is also necessary to obtain an independent input reference quantity—speed. For each additional input reference quantity, there will be one more sensor device, which increases the cost of the device. For IoT devices, Kalman Filter is not suitable for filtering because there are no parameters other than the obtained ToF values to refer to.

2. Complexity of the Processing Side is Increased.

In the related art, the processing of the original value of ranging may only be in a mobile device. If applied to the pointing control scenario for the smart homes, the processing may need to be in the mobile phone and may also need to incorporate sensors such as accelerometers or gyroscopes. In the one-to-many ranging scenario of the present disclosure, the mobile phone may process the ToF values input by multiple IoT devices at the same time, which increases the complexity of the mobile phone.

In view of the above, the present disclosure provides a UWB ranging method, which is applied to a device supporting UWB function. In the UWB ranging method, the obtained ToF for UWB ranging is filtered based on a low-pass filter, and the UWB ranging is performed based on the filtered ToF. In this way, the jitter of the ToF can be removed to ensure the accuracy of the UWB ranging results. Here, ToF is determined using the UWB ranging process between two devices supporting the UWB function. It can be seen that there is no additional sensors needed in the present disclosure, which reduces the complexity.

In the embodiments of the present disclosure, the executing subject of the ranging method may be a hardware device with data information capability, and/or software for driving the hardware device to work. In the present disclosure, the execution subject may be a device supporting the UWB function, such as a mobile phone and/or an IoT device.

In the pointing control scenario, the filtering processing for ToF may be in the IoT device. In other words, after the ToF value is obtained by the IoT device, the IoT device uses a low-pass filter to filter the ToF value, and returns the filtered ToF value to the mobile phone for calculating the distance between the IoT device and the mobile phone. Thus, there is no need for the mobile phone to add additional processing logic, and the complexity of one-to-many pointing control is reduced.

It should be noted that the above embodiments, in the scenario where the mobile phone performs the pointing control on the IoT device, are illustrated by taking the filtering processing performed on the ToF in the IoT device as an example for ease of understanding. However, it is not limited that the filtering processing performed on the ToF of the present disclosure is only applicable to IoT devices and may also be in the mobile phone. It should be understood that the devices using the UWB ranging method of the present disclosure are all within the protection scope of the present disclosure.

The following embodiments will illustrate the UWB ranging method provided by the present disclosure with reference to the accompanying drawings.

Figure 2:
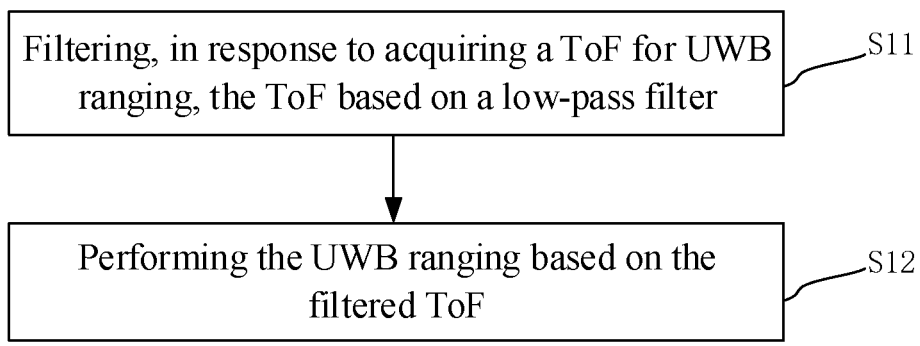
FIG. 2 is a flow chart of a UWB ranging method illustrated according to an embodiment.

FIG. 2 is a flow chart of a UWB ranging method illustrated according to an embodiment. As shown in FIG. 2, the UWB ranging method includes the following steps.

At step S11, in response to determining a ToF for UWB ranging, the ToF is filtered based on a low-pass filter.

In the embodiments of the present disclosure, the ToF is acquired based on a ranging period. The ranging period may be set according to the actual ranging scenario. The ToF is filtered based on the low-pass filter in order to remove the jitter of the ToF due to factors such as jitter of system parameters, random errors in the measurement process, and/or environmental interference.

At step S12, the UWB ranging is performed based on the filtered ToF.

Figure 3:
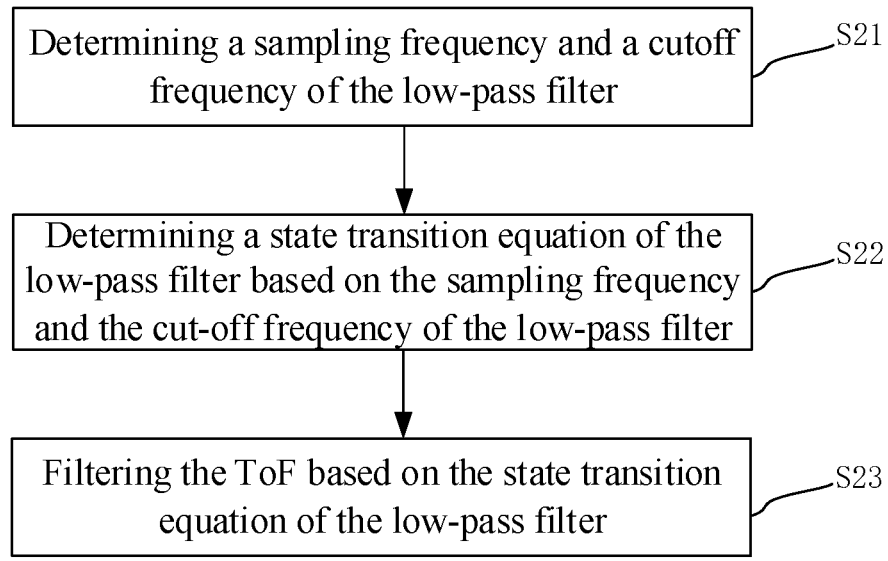
FIG. 3 is a flow chart of filtering processing illustrated according to an embodiment.

The present disclosure describes the process of filtering the ToF by using the low-pass filter with reference to FIG. 3. FIG. 3 is a flow chart of filtering processing illustrated according to an embodiment. As shown in FIG. 3, the filtering processing of the ToF based on the low-pass filter includes the following steps S21 to S23.

At step S21, a sampling frequency and a cutoff frequency of the low-pass filter are determined.

The ranging period is set according to the actual ranging scenario. A ranging frequency is determined according to the ranging period, which is taken as the sampling frequency of the low-pass filter. The cutoff frequency is determined according to the actual ranging scenario. In the embodiments of the present disclosure, the filtering processing is mainly performed on the high frequency jitter from the system UWB signal processing process. Accordingly, the cutoff frequency may be set to 1 Hz in the implementation of the present disclosure.

At step S22, a state transition equation of the low-pass filter is determined based on the sampling frequency and the cut-off frequency of the low-pass filter.

In the embodiments of the present disclosure, the state transition equation of the low-pass filter is determined by the following steps.

At step S221, a state transition equation parameter of the low-pass filter is determined based on the sampling frequency and cutoff frequency of the low-pass filter, and an order n of the low-pass filter is determined.

In the embodiments of the present disclosure, taking the pointing control scenario of a smart home as an example, the user holds the terminal to perform pointing control on the IoT device in front of the terminal, and the terminal basically remains stationary or moves slowly during the whole process. Thus, the jitter of the ToF is mainly caused by the high-frequency jitter in the system UWB signal processing, and a lower cutoff frequency, such as 1 Hz, may be set.

The state transition equation parameter of the low-pass filter is used to determine the weights occupied by the m processed ToFs when the currently acquired ToF is iteratively processed using the m processed ToFs.

The following is a description for determining the state transition equation parameters of the low-pass filter based on the sampling frequency and cutoff frequency of the low-pass filter in the present disclosure, using the low-pass filter as an example of a second-order Butterworth low-pass filter.

There are various methods of digital filters, among which the common method is to obtain the corresponding analog filter based on the cutoff frequency, then perform denormalization to convert the analog filter to digital filter using bilinear transformation, and finally convert it to a difference equation.

The normalized S-domain transfer function of the second-order Butterworth filter described in the present disclosure is shown below. That is, the cutoff frequency is $$\frac{1}{2\pi} \text{ Hz}.$$

$$H(s) = \frac{1}{s^2 + 1.414s + 1}. \quad \text{Equation 1}$$

The sampling frequency of the desired filter is set to $f_s$ and the cutoff frequency is set to $f_d$. Then the cutoff angle frequency of the corresponding analog filter is Equation 2:

$$w_a = 2\pi f_a = 2f_a \tan\left(\frac{\pi f_d}{f_s}\right).$$

S-domain is converted to Z-domain by bilinear transformation, which corresponds to the following equation.

$$S = 2f_s \frac{1-z^{-1}}{1+z^{-1}}. \quad \text{Equation 3}$$

Equation 3 is substituted into Equation 1, and a denormalization process is performed using Equation 2, which converts the cutoff frequency of the filter to the desired frequency, resulting in the following equation.

$$H(z) = \frac{1}{\left(\frac{\frac{1-z^{-1}}{1+z^{-1}}}{\tan\left(\frac{\pi f_d}{f_s}\right)}\right)^2 + 1.414 \left(\frac{\frac{1-z^{-1}}{1+z^{-1}}}{\tan\left(\frac{\pi f_d}{f_s}\right)}\right) + 1} = \quad \text{Equation 4}$$

$$\frac{\left(\tan\left(\frac{\pi f_d}{f_s}\right)\right)^2}{\left(\frac{1-z^{-1}}{1+z^{-1}}\right)^2 + 1.414\left(\frac{1-z^{-1}}{1+z^{-1}}\right) * \left(\tan\left(\frac{\pi f_d}{f_s}\right)\right) + \left(\tan\left(\frac{\pi f_d}{f_s}\right)\right)^2}.$$

Allowing tan $$\left(\frac{\pi f_d}{f_s}\right)$$

to be $\Omega_{new}$, Equation 4 is simplified to obtain Equation 5:

$$H(z) = \frac{Y(z)}{X(z)} = \frac{\Omega_{new}^2 + 2\Omega_{new}^2 z^{-1} + \Omega_{new}^2 z^{-2}}{\left(1 + 1.414\Omega_{new} + \Omega_{new}^2\right) + \left(2\Omega_{new}^2 - 2\right)z^{-1} + \left(1 - 1.414\Omega_{new} + \Omega_{new}^2\right)z^{-2}},$$

where Y(z) is the output of the filter, and X(z) is the input of the filter.

The following equation may be obtained by renaming each coefficient of Equation 5.

$$H(z) = \frac{Y(z)}{X(z)} = \frac{B_0 + B_1 z^{-1} + B_2 z^{-2}}{c + A_1 z^{-1} + A_2 z^{-2}}. \quad \text{Equation 6}$$

In order to obtain the final input-output relationship, Equation 6 is therefore expanded to obtain the following equation.

$$Y(z)\left(c + A_1 z^{-1} + A_2 z^{-2}\right) = X(z)\left(B_0 + B_1 z^{-1} + B_2 z^{-2}\right) \quad \text{Equation 7}$$

$$Y(z) = \frac{B_0}{c} X(z) + \frac{B_1}{c} X(z) z^{-1} + \frac{B_2}{c} X(z) z^{-2} - \frac{A_1}{c} Y(z) z^{-1} + \frac{A_2}{c} Y(z) z^{-2}$$

$$Y(z) = \frac{B_0}{c} X(z) + \frac{B_1}{c} X(z-1) + \frac{B_2}{c} X(z-2) - \frac{A_1}{c} Y(z-1) + \frac{A_2}{c} Y(z-2).$$

The above Equation 7 can be further simplified to Equation 8: $Y(z) = b_0 X(z) + b_1 X(z-1) + b_2 X(z-2) - a_1 Y(z-1) - a_2 Y(z-2)$.

The corresponding difference equation is shown in the following equation, where p is the current period, p−1 is the previous period, and p−2 is the first two periods of the current period.

$$Y(p)=b_0X(p)+b_1X(p-1)+b_2X(p-2)-a_1Y(p-1)+a_2Y(p-2).$$ Equation 9:

As can be seen from the derivation of the above equations, the coefficients are as follows.

$$\Omega_{new} = \tan\left(\frac{\pi f_d}{f_s}\right).$$

$$c = 1 + 1.414\Omega_{new} + \Omega_{new}^2.$$

$$b0 = \frac{B_0}{c} = \frac{\Omega_{new}^2}{c}.$$

$$b1 = \frac{B_1}{c} = \frac{2\Omega_{new}^2}{c}.$$

$$b2 = \frac{B_2}{c} = \frac{\Omega_{new}^2}{c}.$$

$$a1 = A_1 = \frac{2\Omega_{new}^2 - 2}{c}.$$

$$a2 = A_2 = \frac{1 - 1.414\Omega_{new} + \Omega_{new}^2}{c}.$$

The above coefficients are the state transition equation parameters.

The order n of the low-pass filter is a positive integer. In the embodiments of the present disclosure, a second-order low-pass filter or a third-order low-pass filter is available. The higher the order of the low-pass filter is, the higher the accuracy of the determined results of the filtering processing will be. The low-pass filter can be selected according to the needs of the actual scenario.

At step S222, m processed ToF(s) is/are determined.

In the present disclosure, the processed ToF(s) is/are m ToF(s) that is/are adjacent to the currently acquired ToF and is/are acquired based on the ranging period before the currently acquired ToF. The m ToF(s) adjacent to the currently acquired ToF is/are processed by a low-pass filter. The number m of processed ToFs is determined according to the order of the low-pass filter.

In the present disclosure, if the low-pass filter is a Butterworth filter, the number of the processed ToF(s) is equal to the order of the low-pass filter. For example, the ToF to be processed is represented by x(m), and the processed ToF is represented by y(m), if the second-order Butterworth filter is used, two processed ToFs are required, then the $(m-1)^{th}$ processed ToF and the $(m-2)^{th}$ processed ToF are determined. In other embodiments, the number of the processed ToF(s) may be different from the order of the low-pass filter if other filters are used.

At step S223, the state transition equation of the low-pass filter is generated based on the state transition equation parameter, the processed ToF, and the currently acquired ToF.

At step S23, the ToF is filtered based on the state transition equation of the low-pass filter.

In the embodiments of the present disclosure, the currently acquired ToF is iterated based on the state transition equation and the processed ToF(s) to obtain the filtered ToF.

Following on from the above example, the ToF is filtered using the second-order Butterworth filter, which includes the following steps.

The ToF of the first UWB ranging is acquired, and the ToF of the first UWB ranging is filtered to obtain the first filtered ToF.

The ToF of the second UWB ranging is obtained, and the ToF of the second UWB ranging is filtered based on the first filtered ToF to obtain the second filtered ToF.

The ToF of the third UWB ranging is obtained, and the ToF of the third UWB ranging is filtered based on the first filtered ToF and the second filtered ToF to obtain the third filtered ToF.

The ToF of the fourth UWB ranging is obtained, and the ToF of the fourth UWB ranging is filtered based on the second filtered ToF and the third filtered ToF to obtain the fourth filtered ToF.

And so on, the currently acquired ToF is iterated using two filtered ToFs adjacent to the currently acquired ToF to obtain a filtered ToF of the currently acquired ToF.

In the embodiments of the present disclosure, the state transition equation satisfies following equation: $y(m)=b_0x(m)-b_1y(m-1)-b_2y(m-2)$.

Here, y(m) represents $m^{th}$ processed ToF, $b_0$ represents a first state transition equation parameter, $b_1$ represents a second state transition equation parameter, $b_2$ represents a third state transition equation parameter, x(m) represents $m^{th}$ ToF, y(m-1) represents $(m-1)^{th}$ processed ToF, and y(m-2) represents $(m-2)^{th}$ processed ToF.

In the embodiments of the present disclosure, the cutoff frequency of the low-pass filter is determined in the following manner: a current cutoff frequency corresponding to a current ranging scenario is determined based on a correspondence between a ranging scenario and the cutoff frequency.

In one embodiments, multiple ranging scenarios, and cutoff frequencies each corresponding to each ranging scenario are provided. In practical application, the current cutoff frequency corresponding to the current ranging scenario is determined according to the current ranging scenario.

Figure 4:
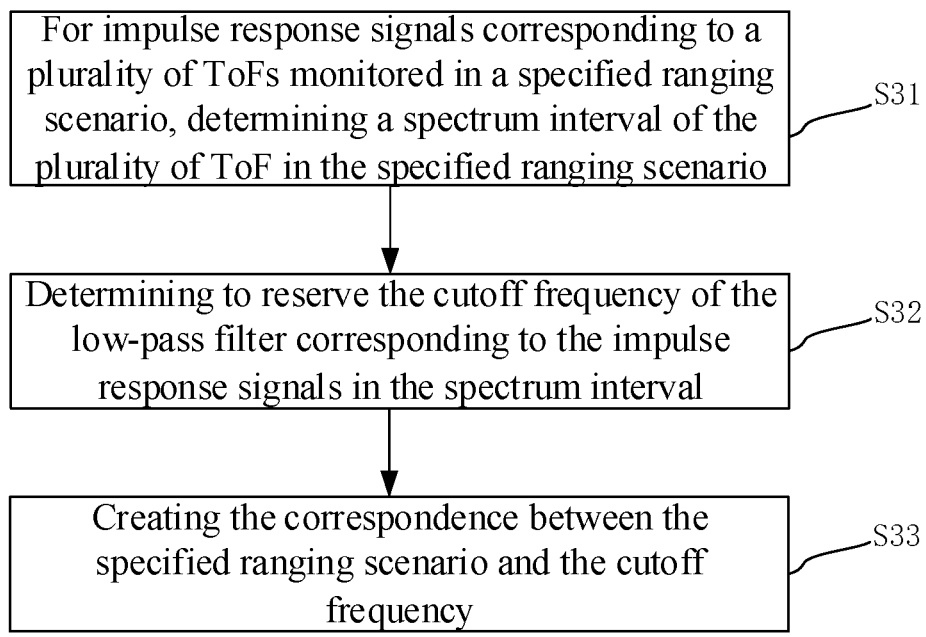
FIG. 4 is a flow chart of determining a correspondence between a ranging scenario and a cutoff frequency illustrated according to an embodiment.

The present disclosure describes the process of determining the correspondence between the ranging scenario and cutoff frequency with reference to FIG. 4. FIG. 4 is a flow chart of determining a correspondence between a ranging scenario and a cutoff frequency illustrated according to an embodiment. As shown in FIG. 4, in the embodiments of the present disclosure, the correspondence between the ranging scenario and the cutoff frequency is determined in the following manner.

At step S31, for impulse response signals corresponding to a plurality of ToFs monitored in a specified ranging scenario, a spectrum interval of the plurality of ToF in the specified ranging scenario is determined.

For example, the impulse response signals corresponding to the plurality of ToFs monitored under different specified ranging scenarios are determined through experiments. Based on the detected impulse response signals corresponding to the plurality of ToFs in each specified ranging scenario, the spectrum interval of the plurality of ToF in one specified ranging scenario is determined. The specified ranging scenario includes different moving frequencies of the user during the process of the pointing control performed by the user, e.g., a ranging scenario where the user is moving slowly, a ranging scenario where the user is walking, etc.

At step S32, the cutoff frequency of the low-pass filter corresponding to the impulse response signals in the spectrum interval is determined to reserve.

At step S33, the correspondence between the specified ranging scenario and the cutoff frequency is created.

The present disclosure provides different ranging scenarios and cutoff frequencies corresponding to different ranging scenarios for selection during UWB ranging, so that the filtering processing can be more closely matched to the ranging scenarios and the accuracy of the filtering processing results can be improved.

In the present disclosure, the acquired ToF for UWB ranging is directly filtered based on the low-pass filter, without additional sensors and reducing processing costs.

Figure 5:
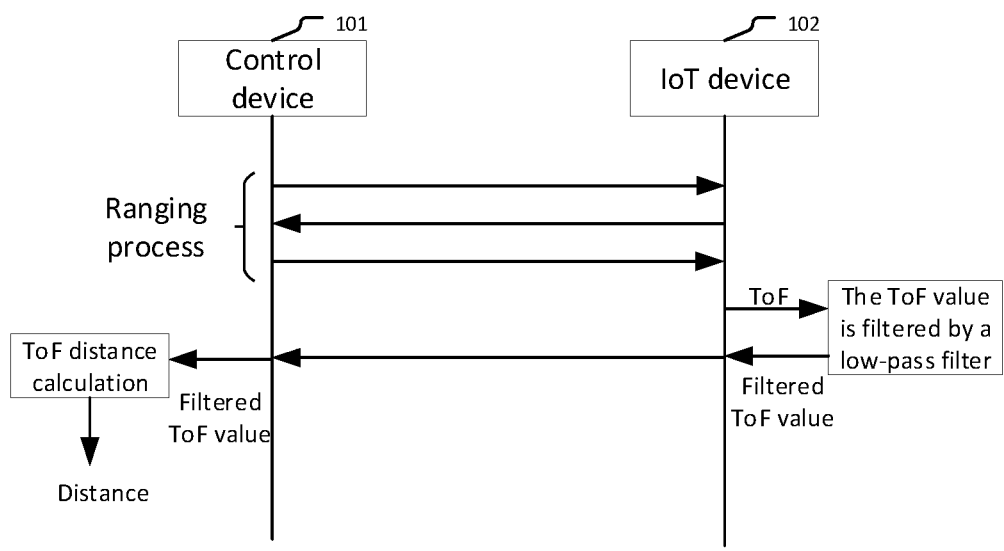
FIG. 5 is a flow chart of an application of a ranging method to an IoT device illustrated according to an embodiment.

In one embodiment, the present disclosure describes an application of a ranging method on an IoT device in conjunction with FIG. 5. FIG. 5 is a flow chart of the application of the ranging method to the IoT device illustrated according to an embodiment. In FIG. 5, the control device 101 may be a mobile phone, or may be other devices with a UWB ranging function. The IoT device 102 has a UWB function. As shown in FIG. 5, the ToF value is filtered with a low-pass filter in the IoT device 102.

The control device 101 first wakes up the IoT device 102 through an out-of-band method (Bluetooth, WiFi, etc.). The control device 101 transmits ranging-related parameters to the IoT device 102, such as ranging period, UWB channel, etc., while waking up the IoT device 102.

After the IoT device 102 is woken up, the control device 101 initiates UWB ranging at a predetermined period. After each round of ranging is completed, the IoT device 102 will obtain the ToF value of the round of ranging.

After obtaining the ToF value, the IoT device 102 performs filtering processing on the ToF value using a low-pass filter to obtain a smooth ToF value after the filtering processing.

The IoT device 102 sends the filtered ToF value back to the control device 101, and the control device 101 obtains the final distance by calculating based on the filtered ToF value.

Figure 6:
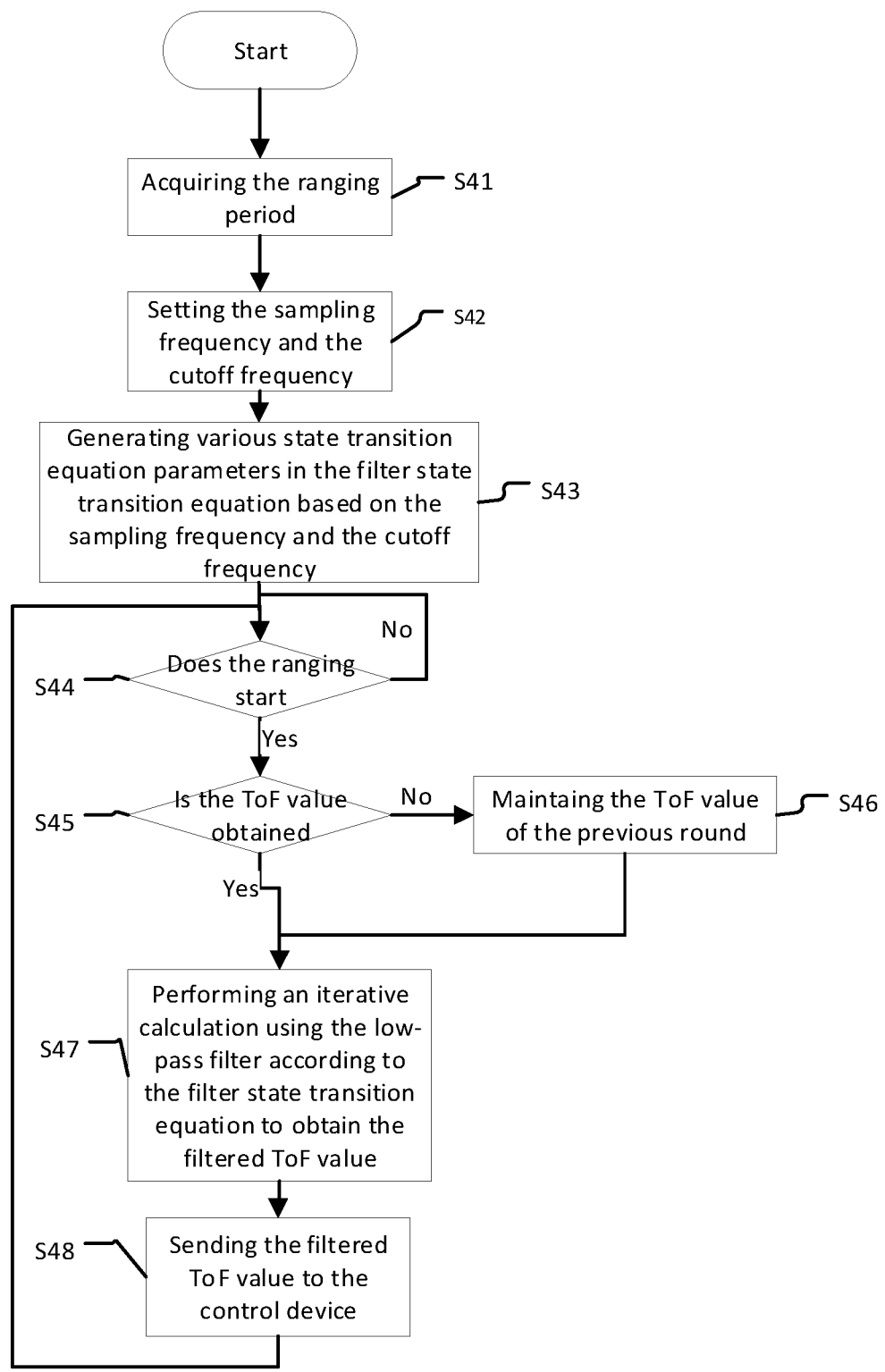
FIG. 6 is a flow chart of filtering processing performed in an IoT device illustrated according to an embodiment.

The present disclosure describes filtering processing performed in the IoT device 102 in conjunction with FIG. 6. FIG. 6 is a flow chart of the filtering processing performed in the IoT device 102 illustrated according to an embodiment. As shown in FIG. 6, the filtering processing performed in the IoT device 102 includes the following steps.

After the control device 101 wakes up the IoT device 102 through Bluetooth, at step S41, the IoT device 102 acquires the ranging period.

At step S42, the IoT device 102 sets the sampling frequency and the cutoff frequency. For example, the IoT device 102 may set the cutoff frequency to 1 Hz.

At step S43, based on the sampling frequency and the cutoff frequency, various state transition equation parameters in the filter state transition equation shown in Equation 1 can be generated in the IoT device 102.

$$y(m)=b_0x(m)-b_1y(m-1)-b_2y(m-2).$$ Equation 1:

At step S44, the IoT device 102 detects whether ranging is started. In this embodiment, the ranging is initiated by the control device 101.

After each round of ranging is completed, the ToF may be obtained by the IoT device 102. Accordingly, at step S45, the IoT device 102 determines whether the ToF value is obtained.

When the current round of ranging fails, the IoT device 102 cannot obtain the ToF value. In order to ensure the normal use of the low-pass filter, in the case that the ranging fails, the ToF value of the previous round is maintained at step S46. That is, the IoT device 102 uses the ToF value of the previous round for processing.

At step S47, the IoT device 102 uses the low-pass filter to perform an iterative calculation according to the filter state transition equation shown in Equation 1 to obtain the filtered ToF value.

At step S48, the IoT device 102 sends the filtered ToF value back to the control device 101.

The ranging method of the present disclosure applies to devices supporting UWB function. In the two devices that support the UWB function, the filtering processing can be performed on the ToF in one of the two devices, or be performed on the ToF in the other one of the two devices. In the following embodiments, the device that sends a ranging initialization frame is represented by a second UWB device, and the device that receives the ranging initialization frame is represented by a first UWB device.

Figure 7:
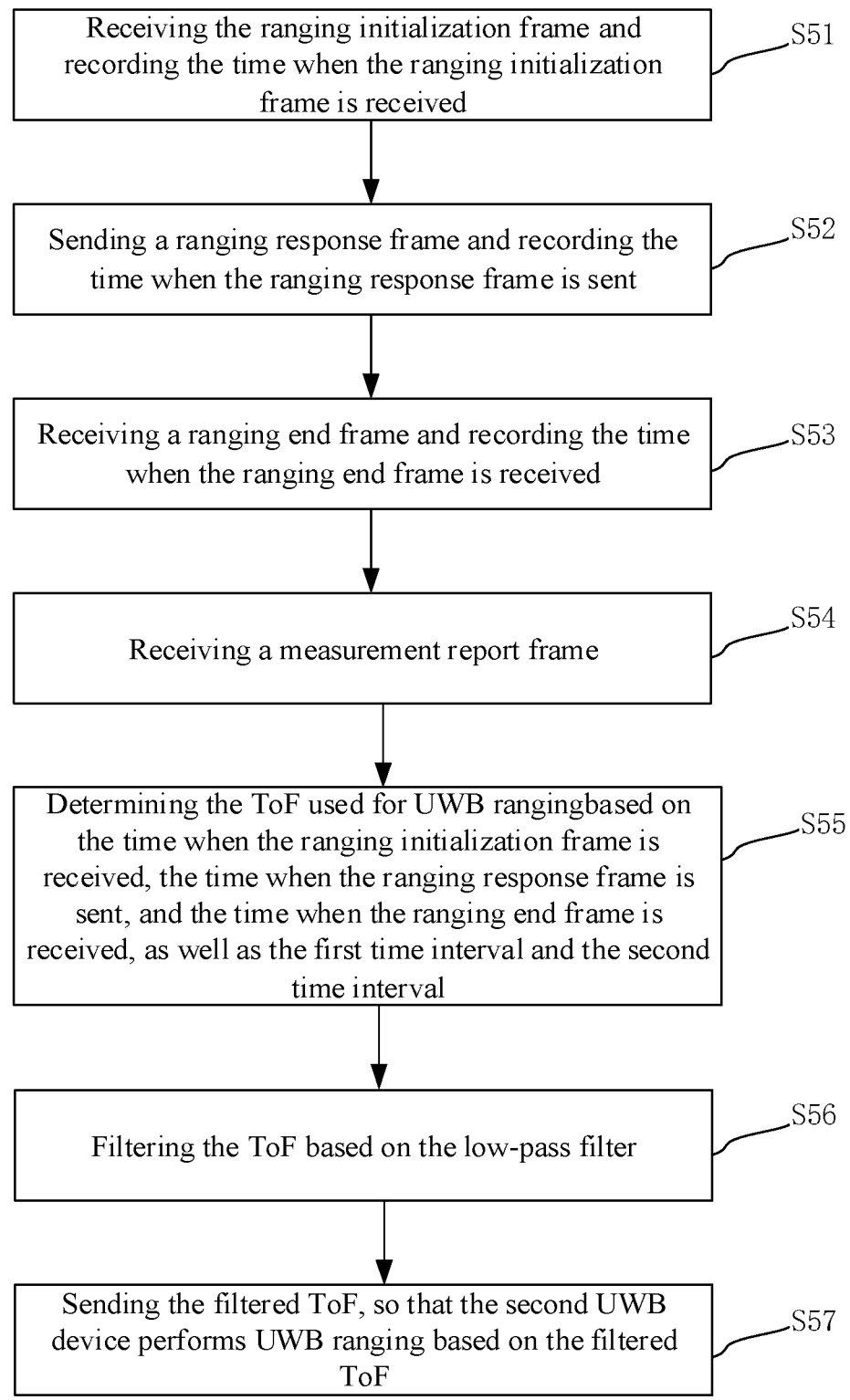
FIG. 7 is a flow chart of an application of a ranging method to a first UWB device illustrated according to an embodiment.

In one embodiment, FIG. 7 is a flow chart of an application of a ranging method to a first UWB device illustrated according to an embodiment. As shown in FIG. 7, the filtering processing performed for ToF in the first UWB device includes the following steps.

At step S51, the first UWB device receives the ranging initialization frame and records the time when the ranging initialization frame is received.

At step S52, the first UWB device sends a ranging response frame and records the time when the ranging response frame is sent.

At step S53, the first UWB device receives a ranging end frame and records the time when the ranging end frame is received.

At step S54, the first UWB device receives a measurement report frame.

The measurement report frame includes a first time interval between the time when the second UWB device sends the ranging initialization frame and the time when the second UWB receives the ranging response frame, and a second time interval between the time when the second UWB device receives the ranging response frame and the time when the second UWB sends the ranging end frame.

At step S55, the first UWB device determines the ToF used for UWB ranging based on the time when the ranging initialization frame is received, the time when the ranging response frame is sent, and the time when the ranging end frame is received, as well as the first time interval and the second time interval.

At step S56, the first UWB device performs the filtering processing on the ToF based on the low-pass filter.

At step S57, the first UWB device sends the filtered ToF, so that the second UWB device performs UWB ranging based on the filtered ToF.

The above embodiment describes the execution of filtering process for the ToF in the first UWB device, and the steps involved in executing the filtering process for the ToF in the second UWB device will be described in the following embodiment.

Figure 8:
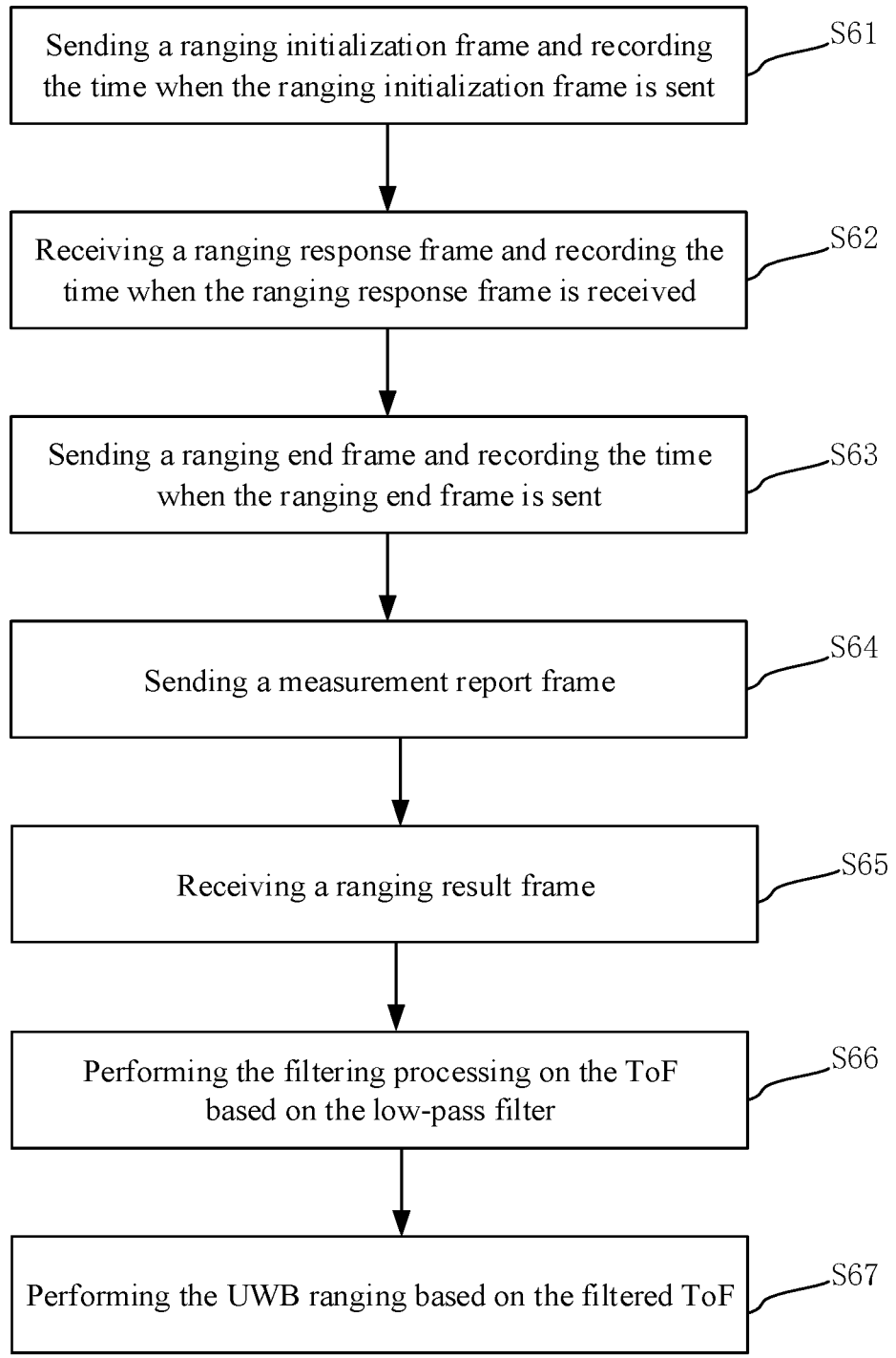
FIG. 8 is a flow chart of an application of a ranging method to a second UWB device illustrated according to an embodiment.

FIG. 8 is a flow chart of an application of a ranging method to a second UWB device illustrated according to an embodiment. As shown in FIG. 8, the UWB ranging method applied to the second UWB device includes the following steps.

At step S61, the second UWB device sends a ranging initialization frame and records the time when the ranging initialization frame is sent.

At step S62, the second UWB device receives a ranging response frame and records the time when the ranging response frame is received.

At step S63, the second UWB device sends a ranging end frame and records the time when the ranging end frame is sent.

At step S64, the second UWB device sends a measurement report frame. The measurement report frame includes a first time interval between the time when the second UWB device sends the ranging initialization frame and the time when the second UWB receives the ranging response frame, and a second time interval between the time when the second UWB device receives the ranging response frame and the time when the second UWB sends the ranging end frame.

At step S65, the second UWB device receives a ranging result frame. The ranging result frame includes the ToF for UWB ranging determined by the first UWB device based on time when the ranging initialization frame is received, the time when the ranging response frame is sent, and the time when the ranging end frame is received, as well as the first time interval and the second time interval.

At step S66, the second UWB device performs the filtering processing on the ToF based on the low-pass filter.

At step S67, the second UWB device performs the UWB ranging based on the filtered ToF.

It should be noted that FIG. 7 and FIG. 8 are not examples of the interaction between two devices when the UWB ranging method is performed on any one of the two devices supporting the UWB function. FIG. 7 shows the process of filtering the ToF in the first UWB device. FIG. 8 shows the process of filtering the ToF in the second UWB device. It can be seen that the process of filtering the ToF can be performed in the first UWB device or in the second UWB device.

Figure 9:
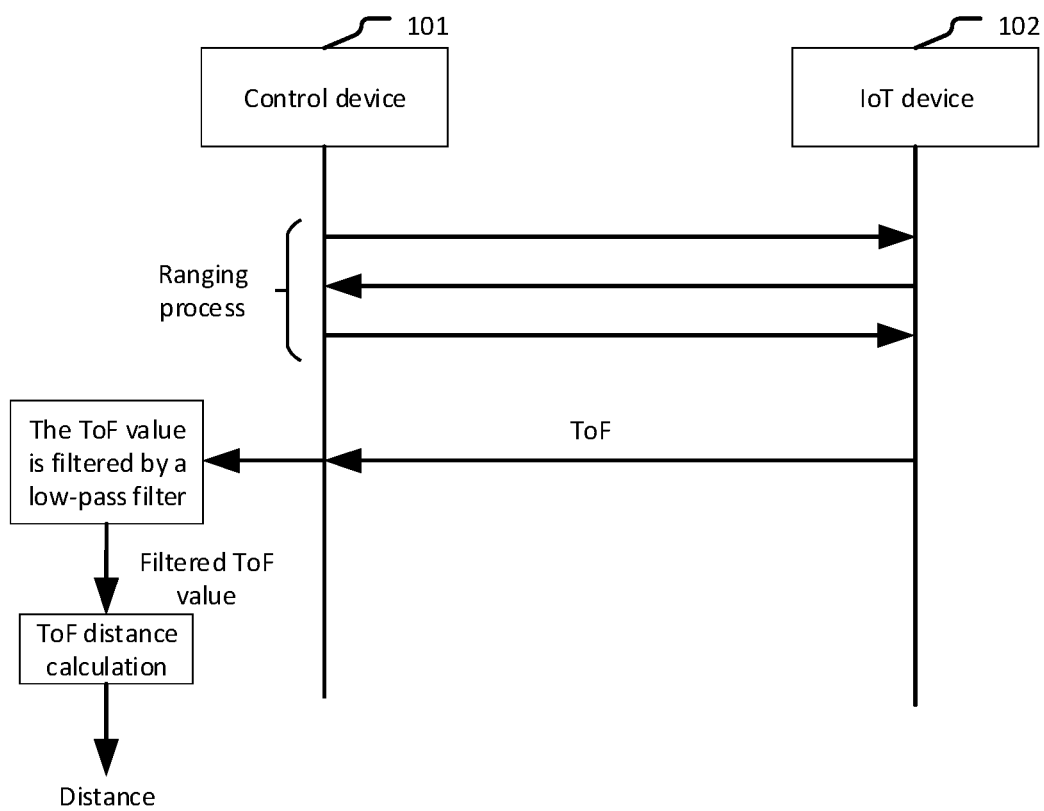
FIG. 9 is a schematic diagram of filtering processing for the time of flight performed in the second UWB device illustrated according to an embodiment.

The process of filtering the ToF in the second UWB device will be described with reference to FIG. 9. FIG. 9 is a schematic diagram of filtering processing for the ToF performed in the second UWB device illustrated according to an embodiment. In FIG. 9, the control device 101 is the second UWB device, and the IoT device 102 is the first UWB device.

After obtaining the ToF value, the control device 101 performs filtering processing on the ToF value using a low-pass filter to obtain a smooth ToF value after the filtering processing.

After the filtered ToF value is obtained, the control device 101 obtains the final distance by calculating based on the filtered ToF value.

Based on the same concept, the embodiments of the present disclosure further provide a UWB ranging apparatus.

It should be understood that, in order to realize the above-mentioned functions, the UWB ranging apparatus provided by the embodiments of the present disclosure includes corresponding hardware structures and/or software modules for executing each function. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

The present disclosure provides a UWB ranging apparatus 1100, which includes: a filter processing unit 1101 configured to filter, in response to determining a first time of flight for UWB ranging, the first time of flight based on a low-pass filter; and a ranging unit 1102 configured to perform the UWB ranging based on the first filtered time of flight.

In one embodiment, the filter processing unit 1101 is further configured to: determine a sampling frequency and a cutoff frequency of the low-pass filter; determine a state transition equation of the low-pass filter based on the sampling frequency and the cut-off frequency of the low-pass filter; and filter the first time of flight based on the state transition equation of the low-pass filter.

In some embodiments, the first time of flight may include the ToF that is acquired in step S11 as shown in FIG. 2.

In one embodiment, the filter processing unit 1101 is further configured to: determine a state transition equation parameter of the low-pass filter based on the sampling frequency and cutoff frequency of the low-pass filter, and determining an order n of the low-pass filter; determine at least one second time of flight, where the number of the at least one second time of flight is determined based on the order n of the low-pass filter, the at least one second time of flight is processed by the low-pass filter before the first time of flight, adjacent the first time of flight, and acquired based on a ranging period, and generate the state transition equation of the low-pass filter based on the state transition equation parameter, the at least one second time of flight, and the first time of flight.

In some embodiments, the second time of flight may include the processed ToFs as determined in the step S222.

In one embodiment, the filter processing unit 1101 is further configured to: obtain the filtered first time of flight by iterating the first time of flight based on the state transition equation and the at least one second time of flight.

In one embodiment, the state transition equation satisfies following equation: $y(m)=b_0 x(m)-b_1 y(m-1)-b_2 y(m-2)$; where $y(m)$ represents $m^{th}$ second time of flight, $b_0$ represents a first state transition equation parameter, $b_1$ represents a second state transition equation parameter; $b_2$ represents a third state transition equation parameter, $x(m)$ represents $m^{th}$ first time of flight, $y(m-1)$ represents $(m-1)^{th}$ second time of flight, and $y(m-2)$ represents $(m-2)^{th}$ second time of flight.

In one embodiment, the filter processing unit 1101 is configured to determine the cutoff frequency by: determining, based on correspondences between ranging scenarios and cutoff frequencies, the cutoff frequency.

In one embodiment, the correspondences between the ranging scenarios and the cutoff frequencies are determined by: for impulse response signals corresponding to a plurality of first times of flight monitored in a specified ranging scenario, determining a spectrum interval of the plurality of first times of flight in the specified ranging scenario; determining to reserve a cutoff frequency of a low-pass filter corresponding to the impulse response signals of the spectrum interval; and creating a correspondence between the specified ranging scenario and the cutoff frequency.

In one embodiment, the first time of flight is acquired based on the ranging period, and the sampling frequency of the low-pass filter is determined based on a ranging frequency determined by the ranging period.

Regarding the apparatus in the above-mentioned embodiments, the specific manner in which each module performs operations has been described in detail in the embodiments of the method, and will not be described in detail here.

By the above embodiments provided in the present disclosure, the acquired time of flight for UWB ranging is filtered based on the low-pass filter, and the UWB ranging is performed based on the filtered time of flight, so that the jitter of the time of flight can be removed and the accuracy of the UWB ranging results can be guaranteed.

Figure 10:
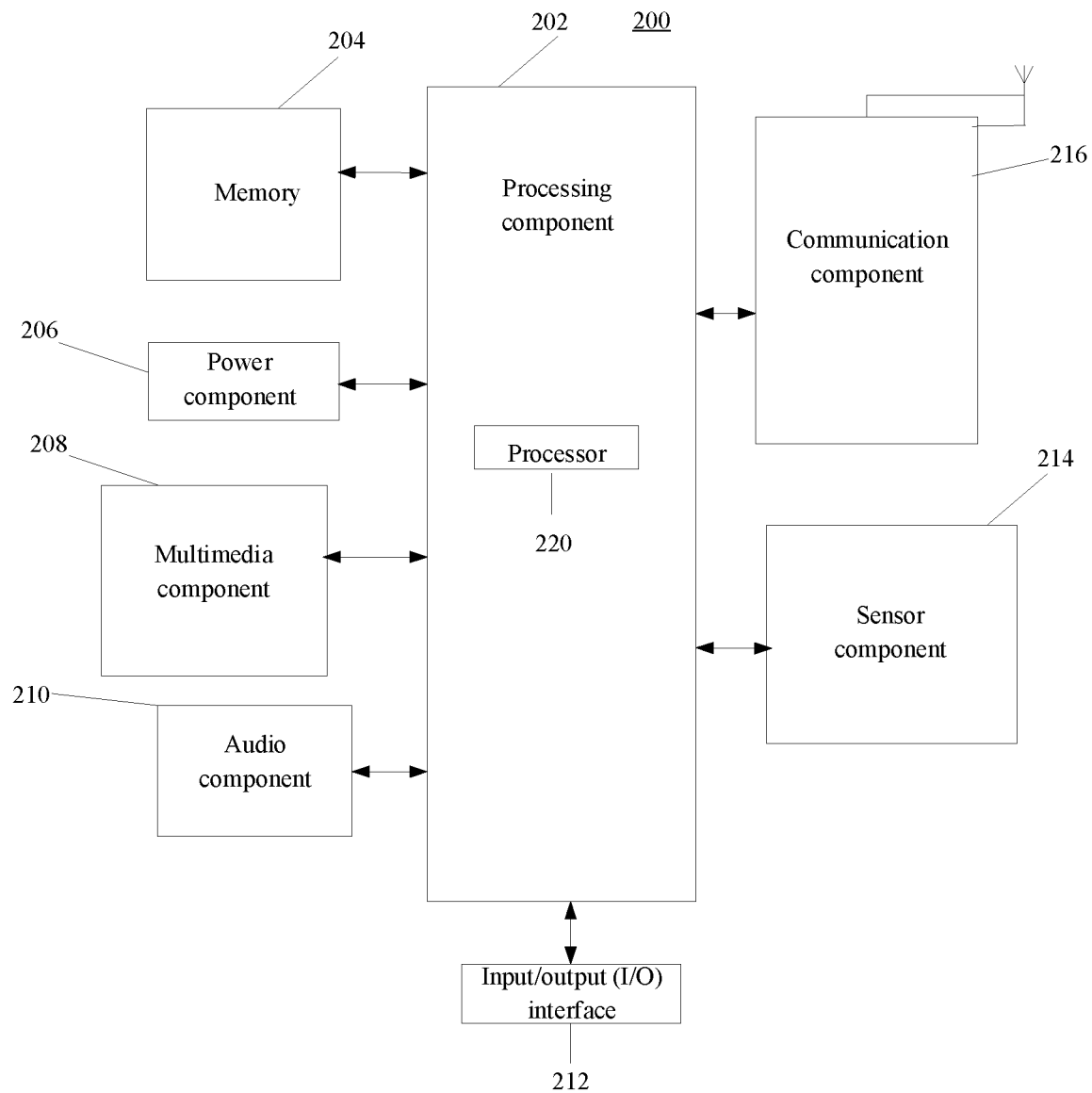
FIG. 10 is a block diagram of a UWB ranging device illustrated according to an embodiment.
Figure 11:
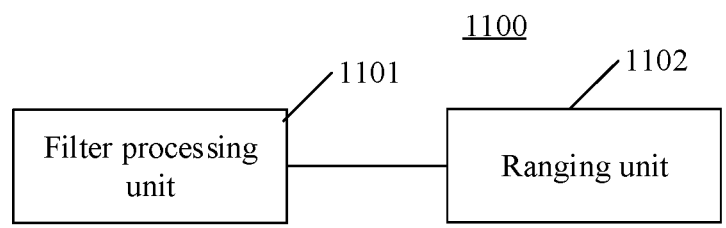
FIG. 11 is a structural schematic diagram of a UWB ranging apparatus illustrated according to an embodiment.

FIG. 10 is a block diagram of a UWB ranging device illustrated according to an embodiment. For example, the device 200 may be may be a cell phone, a computer, a digital broadcast terminal, a message sending and receiving device, a game console, a tablet device, a medical device, a fitness device, a personal digital assistant, and the like.

Referring to FIG. 10, the device 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls the overall operation of the device 200, such as operations associated with display, phone call, data communication, camera operation, and recording operations. The processing component 202 may include one or more processors 220 to execute instructions to complete all or some of the steps of the method described above. In addition, the processing component 202 may include one or more modules that facilitate interaction between processing component 202 and other components. For example, processing component 202 may include a multimedia module to facilitate interaction between multimedia component 208 and processing component 202.

The memory 204 is configured to store various types of data to support operation at the electronic device 200. Examples of such data include instructions for any application or method of operation on the device 200, contact data, phonebook data, messages, images, videos, etc. The memory 204 can be implemented by any type of transitory or non-transitory storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 206 provides power to the various components of the device 200. The power component 206 may include a power management system, one or more power supplies, and other components associated with generating, managing, and distributing power for the device 200.

The multimedia component 208 includes a screen providing an output interface between the device 200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 208 includes a front-facing camera and/or a rear-facing camera. The front camera and/or rear camera can receive external multimedia data when the device 200 is in an operating mode, such as shooting mode or video mode. Each front camera and rear camera may be a fixed optical lens system or have focal length and optical zoom capability.

The audio component 210 is configured to output and/or input audio signals. For example, the audio component 210 includes a microphone (MIC) configured to receive external audio signals when the device 200 is in an operating mode, such as call mode, recording mode, and voice recognition mode. The received audio signal may be further stored in memory 204 or sent via communication component 216. In some embodiments, the audio component 210 further includes a speaker for outputting audio signals.

The I/O interface 212 provides an interface between the processing component 202 and a peripheral interface module. The peripheral interface module may be a keyboard, click wheel, button, etc. These buttons may include, but are not limited to, a home button, a volume button, a start button, and a lock button.

The sensor component 214 includes one or more sensors for providing status assessment of various aspects of the device 200. For example, the sensor component 214 may detect an open/closed state of the device 200, the relative positioning of components, such as the components being the display and keypad of the device 200, the sensor component 214 may also detect a change in position of the device 200 or a component of the device 200, the presence or absence of user contact with the device 200, the orientation or acceleration/deceleration of the device 200 and temperature changes of the device 200. The sensor component 214 may include a proximity sensor configured to detect the presence of a nearby object in the absence of any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication between the device 200 and other devices by wired or wireless means. The device 200 may access a wireless network based on a communication standard, such as WiFi, 2G, 3G, 4G, 5G, or a combination thereof. In one embodiment, communication component 216 receives broadcast signals or broadcast-related information from an external broadcast management system via a broadcast channel. In an embodiment, the communication component 216 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 200 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing above mentioned method for measuring the distance.

In some embodiments, there is also provided a non-transitory computer readable storage medium including instructions, such as a memory 204 including instructions, the instructions being executable by the processor 220 of the device 200 to accomplish the method described above. For example, the non-transitory computer readable storage medium may be ROM, random access memory (RAM), CD-ROM, magnetic tape, floppy disk, and optical data storage devices, among others.

It should be understood that in the present disclosure, "multiple" or "a plurality of" refers to two or more than two, and other quantifiers are similar. "And/or", which describes the association relationship of the associated objects, means that there can be three kinds of relationships, for example, A and/or B can mean that A exists alone, A and B exist at the same time, and B exists alone. The character "/" generally indicates an "or" relationship between the preceding and following associated objects of the character. The singular forms "a/an" "the," and "said" are intended to include the plural forms as well, unless the context clearly dictates otherwise.

It should be further understood that the terms "first", "second", etc. are used to describe various information, but the information should not be limited by these terms. These terms are only used to distinguish the same type of information from one another, and do not imply a particular order or level of importance. In fact, the expressions "first", "second" etc. are used interchangeably. For example, the first information may also be referred to as the second information, and similarly, the second information may also be referred to as the first information, without departing from the scope of the present disclosure.

It should be further understood that, unless otherwise specified, the term "connection" includes a direct connection between the two without the presence of other components, as well as an indirect connection between the two with the presence of other elements.

It should be further understood that, although the operations in the embodiments of the present disclosure are described in a specific order in the drawings, it should not be construed as requiring that the operations be performed in the specific order shown or the serial order, or as requiring that all of the operations shown be performed to obtain the desired result. Multitasking and parallel processing may be advantageous in certain circumstances.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the scope of the appended claims.

What is claimed is:

1. An Ultra Wide Band (UWB) ranging method, comprising:
    filtering, in response to determining a first time of flight for UWB ranging, the first time of flight based on a low-pass filter to obtain a filtered first time of flight; and
    performing the UWB ranging based on the filtered first time of flight;
    wherein filtering the first time of flight based on the low-pass filter comprises:
    determining a sampling frequency and a cutoff frequency of the low-pass filter;
    determining a state transition equation of the low-pass filter based on the sampling frequency and the cut-off frequency of the low-pass filter; and
    filtering the first time of flight based on the state transition equation of the low-pass filter.

2. The UWB ranging method of claim 1, wherein determining the state transition equation of the low-pass filter based on the sampling frequency and the cut-off frequency of the low-pass filter comprising:
    determining a state transition equation parameter of the low-pass filter based on the sampling frequency and cutoff frequency of the low-pass filter, and determining an order n of the low-pass filter, wherein n is a positive integer;
    determining at least one second time of flight, wherein a quantity of the at least one second time of flight is determined based on the order n of the low-pass filter, the at least one second time of flight is processed by the low-pass filter before the first time of flight, adjacent the first time of flight, and acquired based on a ranging period; and
    generating the state transition equation of the low-pass filter based on the state transition equation parameter, the at least one second time of flight, and the first time of flight.

3. The UWB ranging method of claim 2, wherein filtering the first time of flight based on the state transition equation of the low-pass filter comprising:
    obtaining the filtered first time of flight by iterating the first time of flight based on the state transition equation and the at least one second time of flight.

4. The UWB ranging method of claim 2, wherein the state transition equation satisfies following equation:

$$y(m)=b_0 x(m)-b_1 y(m-1)-b_2 y(m-2);$$

wherein $y(m)$ represents $m^{th}$ second time of flight, $b_0$ represents a first state transition equation parameter, $b_1$ represents a second state transition equation parameter; $b_2$ represents a third state transition equation parameter, $x(m)$ represents $m^{th}$ first time of flight, $y(m-1)$ represents $(m-1)^{th}$ second time of flight, and $y(m-2)$ represents $(m-2)^{th}$ second time of flight.

5. The UWB ranging method of claim 2, wherein:
    the first time of flight is acquired based on the ranging period, and
    the sampling frequency of the low-pass filter is determined based on a ranging frequency determined by the ranging period.

6. The UWB ranging method of claim 1, wherein the state transition equation satisfies following equation:

$$y(m)=b_0 x(m)-b_1 y(m-1)-b_2 y(m-2);$$

wherein $y(m)$ represents $m^{th}$ second time of flight, $b_0$ represents a first state transition equation parameter, $b_1$ represents a second state transition equation parameter; $b_2$ represents a third state transition equation parameter, $x(m)$ represents $n^{th}$ first time of flight, $y(m-1)$ represents $(m-1)^{th}$ second time of flight, and $y(m-2)$ represents $(m-2)^{th}$ second time of flight.

7. The UWB ranging method of claim 1, wherein determining the cutoff frequency of the low-pass filter comprises:
    determining, based on correspondences between ranging scenarios and cutoff frequencies, the cutoff frequency.

8. The UWB ranging method of claim 7, further comprising determining the correspondences between the ranging scenarios and the cutoff frequencies by:
    for impulse response signals corresponding to a plurality of first times of flight monitored in a specified ranging scenario, determining a spectrum interval of the plurality of first times of flight in the specified ranging scenario;
    determining to reserve a cutoff frequency of a low-pass filter corresponding to the impulse response signals of the spectrum interval; and
    creating a correspondence between the specified ranging scenario and the cutoff frequency.

9. An Ultra Wide Band (UWB) ranging device, comprising:
    a processor; and
    a memory for storing instructions executable by the processor;

wherein the processor is configured to:
filter, in response to determining a first time of flight for UWB ranging, the first time of flight based on a low-pass filter to obtain a filtered first time of flight; and
perform the UWB ranging based on the filtered first time of flight;
wherein the processor is further configured to:
determine a sampling frequency and a cutoff frequency of the low-pass filter;
determine a state transition equation of the low-pass filter based on the sampling frequency and the cut-off frequency of the low-pass filter; and
filter the first time of flight based on the state transition equation of the low-pass filter.

10. The UWB ranging device of claim 9, wherein the processor is further configured to:
determine a state transition equation parameter of the low-pass filter based on the sampling frequency and cutoff frequency of the low-pass filter, and determining an order n of the low-pass filter, wherein n is a positive integer;
determine at least one second time of flight, wherein a quantity of the at least one second time of flight is determined based on the order n of the low-pass filter, the at least one second time of flight is processed by the low-pass filter before the first time of flight, adjacent the first time of flight, and acquired based on a ranging period; and
generate the state transition equation of the low-pass filter based on the state transition equation parameter, the at least one second time of flight, and the first time of flight.

11. The UWB ranging device of claim 10, the processor is further configured to:
obtain the filtered first time of flight by iterating the first time of flight based on the state transition equation and the at least one second time of flight.

12. The UWB ranging device of claim 10, wherein the state transition equation satisfies following equation:

$$y(m)=b_0 x(m)-b_1 y(m-1)-b_2 y(m-2);$$

wherein $y(m)$ represents $m^{th}$ second time of flight, $b_0$ represents a first state transition equation parameter, $b_1$ represents a second state transition equation parameter; $b_2$ represents a third state transition equation parameter, $x(m)$ represents $m^{th}$ first time of flight, $y(m-1)$ represents $(m-1)^{th}$ second time of flight, and $y(m-2)$ represents $(m-2)^{th}$ second time of flight.

13. The UWB ranging device of claim 10, wherein:
the first time of flight is acquired based on the ranging period, and
the sampling frequency of the low-pass filter is determined based on a ranging frequency determined by the ranging period.

14. The UWB ranging device of claim 9, wherein the state transition equation satisfies following equation:

$$y(m)=b_0 x(m)-b_1 y(m-1)-b_2 y(m-2);$$

wherein $y(m)$ represents $m^{th}$ second time of flight, $b_0$ represents a first state transition equation parameter, $b_1$ represents a second state transition equation parameter; $b_2$ represents a third state transition equation parameter, $x(m)$ represents $m^{th}$ first time of flight, $y(m-1)$ represents $(m-1)^{th}$ second time of flight, and $y(m-2)$ represents $(m-2)^{th}$ second time of flight.

15. The UWB ranging device of claim 9, wherein the processor is further configured to:
determine, based on correspondences between ranging scenarios and cutoff frequencies, the cutoff frequency.

16. The UWB ranging device of claim 15, wherein the processor is configured to determine the correspondences between the ranging scenarios and the cutoff frequencies by:
for impulse response signals corresponding to a plurality of first times of flight monitored in a specified ranging scenario, determining a spectrum interval of the plurality of first times of flight in the specified ranging scenario;
determining to reserve a cutoff frequency of a low-pass filter corresponding to the impulse response signals of the spectrum interval; and
creating a correspondence between the specified ranging scenario and the cutoff frequency.

17. A non-transitory storage medium, storing instructions that, when executed by a processor of a mobile terminal, enable the mobile terminal to perform acts comprising:
filtering, in response to determining a first time of flight for UWB ranging, the first time of flight based on a low-pass filter to obtain a filtered first time of flight; and
performing the UWB ranging based on the filtered first time of flight;
wherein filtering the first time of flight based on the low-pass filter comprises:
determining a sampling frequency and a cutoff frequency of the low-pass filter;
determining a state transition equation of the low-pass filter based on the sampling frequency and the cut-off frequency of the low-pass filter; and
filtering the first time of flight based on the state transition equation of the low-pass filter.

* * * * *